US008103853B2

(12) United States Patent
Ramesh et al.

(10) Patent No.: US 8,103,853 B2
(45) Date of Patent: Jan. 24, 2012

(54) INTELLIGENT FABRIC SYSTEM ON A CHIP

(75) Inventors: Tirumale K. Ramesh, Centreville, VA (US); John L. Meier, St. Charles, MO (US)

(73) Assignee: The Boeing Company, Chicago, IL (US)

(*) Notice: Subject to any disclaimer, the term of this patent is extended or adjusted under 35 U.S.C. 154(b) by 638 days.

(21) Appl. No.: 12/042,706

(22) Filed: Mar. 5, 2008

(65) Prior Publication Data

US 2009/0228684 A1 Sep. 10, 2009

(51) Int. Cl.
G06F 15/80 (2006.01)
(52) U.S. Cl. .............................. 712/17; 712/15; 712/225
(58) Field of Classification Search .................. 712/10, 712/11, 15, 17, 20, 220, 225
See application file for complete search history.

(56) References Cited

U.S. PATENT DOCUMENTS

| | | | | |
|---|---|---|---|---|
| 4,491,932 A * | 1/1985 | Ruhman et al. | | 382/131 |
| 5,148,481 A * | 9/1992 | Abraham et al. | | 380/46 |
| 5,832,291 A * | 11/1998 | Rosen et al. | | 712/11 |
| 5,960,086 A * | 9/1999 | Atalla | | 380/44 |
| 5,960,211 A * | 9/1999 | Schwartz et al. | | 712/22 |
| 6,145,072 A * | 11/2000 | Shams et al. | | 712/22 |
| 6,151,668 A * | 11/2000 | Pechanek et al. | | 712/24 |
| 6,744,729 B2 | 6/2004 | Tinsley | | |
| 7,058,968 B2 * | 6/2006 | Rowland et al. | | 726/1 |
| 7,299,339 B2 | 11/2007 | Ramesh | | |
| 7,506,297 B2 * | 3/2009 | Mukherjee et al. | | 716/18 |
| 7,539,866 B2 * | 5/2009 | Kang et al. | | 713/171 |
| 2002/0129264 A1 * | 9/2002 | Rowland et al. | | 713/200 |
| 2003/0084337 A1 * | 5/2003 | Simionescu et al. | | 713/200 |
| 2003/0182162 A1 * | 9/2003 | Stevens | | 705/2 |
| 2004/0255000 A1 * | 12/2004 | Simionescu et al. | | 709/208 |
| 2005/0182582 A1 | 8/2005 | Chen | | |
| 2005/0278680 A1 * | 12/2005 | Mukherjee et al. | | 716/16 |
| 2006/0031450 A1 | 2/2006 | Unrue et al. | | |
| 2006/0095716 A1 | 5/2006 | Ramesh | | |
| 2007/0033369 A1 * | 2/2007 | Kasama et al. | | 711/170 |
| 2008/0040574 A1 | 2/2008 | Ramesh | | |

FOREIGN PATENT DOCUMENTS

EP 638867 A2 * 2/1995

* cited by examiner

*Primary Examiner* — Aimee Li
(74) *Attorney, Agent, or Firm* — Klintworth & Rozenblat IP LLC

(57) ABSTRACT

A chip having an intelligent fabric may include a soft application processor, a reconfigurable hardware intelligent processor, a partitioned memory storage, and an interface to an external reconfigurable communication processor. The reconfigurable hardware intelligent processor may be configured to implement a distributed reconfigurable processor, and to provide cognitive control for at least one of allocation, reallocation, and performance monitoring.

25 Claims, 11 Drawing Sheets

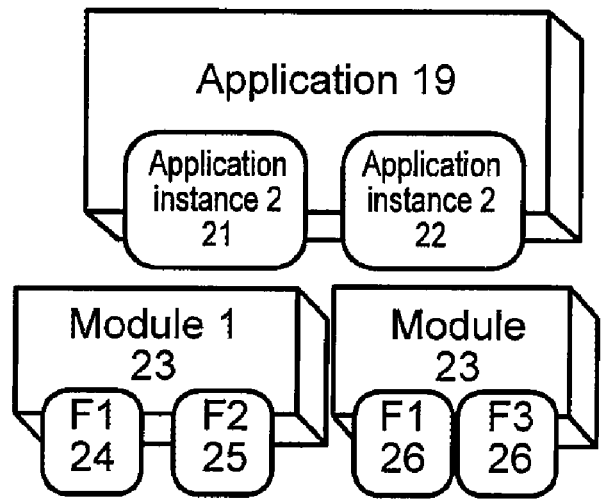
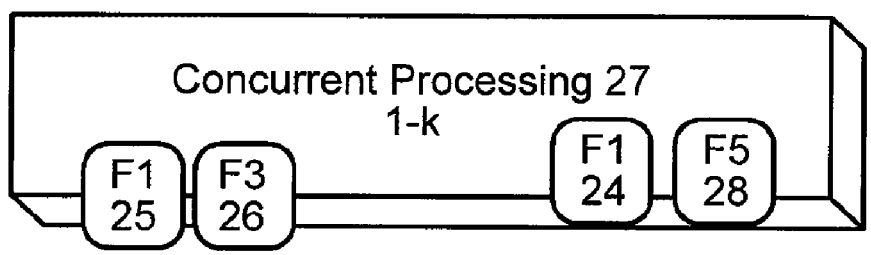
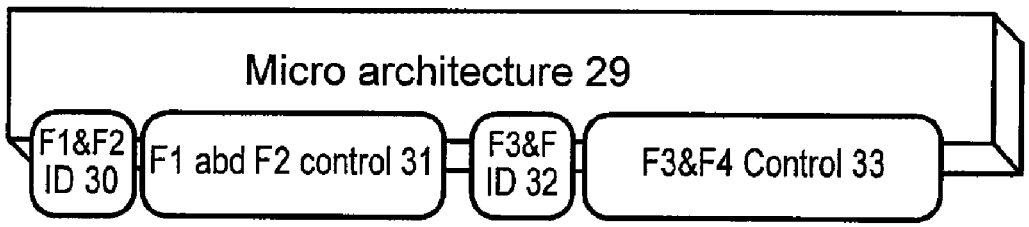
FIG. 6

INTELLIGENT FABRIC SYSTEM ON A CHIP

BACKGROUND

System-on chip (SoC) is a major trend for small form factor, reduced cost, and reduced power solutions which may take full advantage of silicon technologies and integration density. Architectural innovations added with new methodologies and tools for design are posing major challenges for SoC builders. Increased number of Intellectual Property blocks (IPs) are being developed and integrated. For SoCs consisting of tens or hundreds of IP blocks, interconnect architectures is a major challenging task as it directly impacts the wire delays and hence the latency of data across the system. Multi-processing high performance interconnection network schemes are often used in on-chip interconnects. However, using a network-centric approach to integrate multiple heterogeneous and complex SoCs may be beneficial for efficiency, time, and cost purposes. In the network-centric approach the communication may take place in the form of intelligent information and data routed through a switch fabric.

There are many challenges for initiating switch fabric technology paths for sensor data travel in embedded environments. Real-time sensors (commercial, military and medical applications) require fast transport of large amounts of data traveling over considerable distances. Instantaneous conversion of analog sensor data to digital using analog-to-digital reduces latency however may put a significantly larger load on the processor and network. The processing fabric near the sensor may reduce the load on the network which may improve the system performance in terms of latency. Many distributed networks use peer-to-peer protocols which are capable of flattening the hierarchy by use of distributed processing. Today, there is a need to provide chip architecture configurations that intelligently manages the chip's performance and allows it to better meet application requirements.

SUMMARY

In one aspect of the disclosure, a fabric chip may have an intelligent fabric comprising: a soft application processor, a reconfigurable hardware intelligent processor, a partitioned memory storage, and an interface to an external reconfigurable communication processor. The reconfigurable hardware intelligent processor may be configured to implement a distributed cognitive processor, may be configured to implement a distributed reconfigurable processor, and may be configured to provide cognitive control for at least one of allocation, reallocation, and performance monitoring.

In another aspect of the disclosure, a method of providing cognitive control for a fabric may be provided. In one step, an intelligent fabric chip may be provided comprising a soft application processor, a reconfigurable hardware intelligent processor, and a distributed memory storage. In another step, cognitive control of the fabric may be provided using the reconfigurable hardware intelligent processor to at least one of allocate, reallocate, performance monitor, and fabric morph.

In still another aspect of the disclosure, a method may be provided for creating a fabric module. The fabric chip may comprise an intelligent fabric comprising a soft application processor, a reconfigurable hardware intelligent processor, a partitioned memory storage, and an interface to an external reconfigurable fabric processor. The reconfigurable hardware intelligent processor may be configured to: implement a general purpose distributed reconfigurable processor and to provide cognitive control for at least one of allocation, reallocation, and performance monitoring. In another step, a fabric module may be created from the at least one provided fabric chip.

BRIEF DESCRIPTION OF DRAWINGS

FIG. 6 shows a box diagram showing morphing of fabric element cells within fabric;

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

As discussed herein, one or more intelligent fabric chip under the disclosure may provide support to combine powerful embedded computing capabilities, advanced networking and security features managed intelligently. These capabilities and features may be mapped into virtual intelligent fabric element cells which are the granular entities of the fabric computing elements. A fabric computing element may be implemented with a template of general-purpose embedded processors (GPP), digital signal processors (DSP), or application specific processors (ASP).

Nodes of the intelligent fabric chip may be distributed and morphed in terms of physical location, implementation and may provide application partitioning which may be completely transparent to the end users. Application specific processors of the fabric chip may comprise specific application processing acceleration engines. Such accelerators may be most flexible when they are mapped into reconfigurable processing elements available as one of the major resources within the fabric chip, or mapped onto an external reconfigurable element via a provided interface on the chip.

Figure 1:
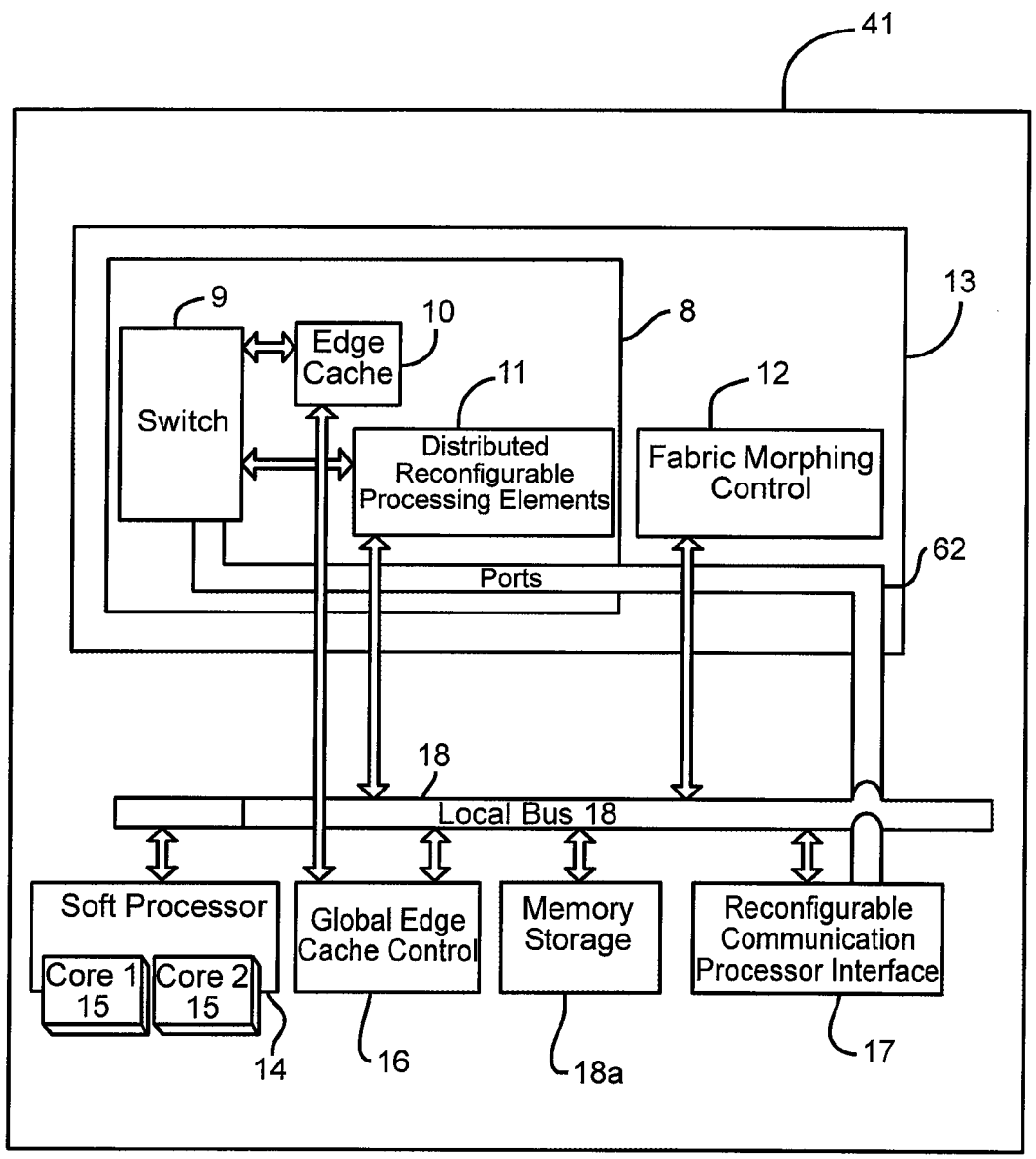
FIG. 1 shows a block diagram showing one embodiment of chip architectural building blocks with components identified.

FIG. 1 is a block diagram showing one embodiment of fabric chip architectural building blocks with components identified. A fabric processor chip 41 may be provided comprising a distributed reconfigurable smart switch 8, an edge cache 10, distributed reconfigurable processing elements 11, a fabric morphing control 12, ports 62, a local bus 18, a soft processor 14, cores 1 and 2 15, a global edge cache control 16, memory storage 18a, and a chip interface 17 to an external reconfigurable communication processor. The distributed reconfigurable smart switch 8 (or the virtual connectivity switch 8) may comprise a smart switch based interconnect that can provide connections of the disparate elements in the fabric. The key elements of the distributed smart reconfigurable switch 8 may include the switch element 9 itself, the distributed reconfigurable processing elements 11, and the switch edge cache 10.

The edge cache 10 may be globally controlled by the edge cache controller 16. The switch 9 may be attached to the edge cache 10, the distributed reconfigurable processing elements 11, and the ports 62. The edge cache 10 may be attached to the edge cache control 16. The distributed reconfigurable processing elements 11 may be attached to the local bus 18 providing access to the chip interface 17, memory storage 18a, global edge cache control 16, and soft processor 14.

The reconfigurable intelligent processor 13 may include all of the components of the distributed reconfigurable smart switch 8, including the switch 9, the edge cache 10, and the distributed reconfigurable processing elements 11, plus ports 62 and fabric morphing control 12. The ports 62 may allow the switch 9 to interact with the chip interface 17 for attaching to a external reconfigurable communication processor. Storage 18a, edge cache control 16, soft processor 14, and cores 15 may be attached through local bus 18. The fabric morphing control 12 may also be attached to local bus 18 providing communication to the chip interface 17.

The soft processor 14 may comprise single core or multiple cores 15. With multiple cores, cores may be allocated and reallocated at run-time to optimize for performance based on the load balancing on these core workloads. Any custom cores for specific functions may be combined into a group of a single entity for aggregation of processing powers from the cores. The general purpose multiple cores may be combined into a parallel processing configuration for achieving greater computational power. In the generality of having the advantage of multiple cores, any group of cores may be combined with distributed reconfigurable processing elements 11 to form a general hardware and software integrated processor. Cognitive processors 93 (shown in FIG. 2) may be derived from the distributed reconfigurable element 11, and may derive from its cognitive decisions fabric states and configuration of the fabric. In addition, the cognitive processor 93 (shown in FIG. 2) may also monitor performance of the computing from soft cores within the soft processor 14. The fabric morphing control 12 may provide global control of fabric element cells morphing from global application instances to a processor micro-architecture 29 (shown in FIG. 6). Storage 18a may comprise a local memory storage element. The reconfigurable communication processor interface 17 may provide a network interface for the chip to attach to a network.

Figure 2:
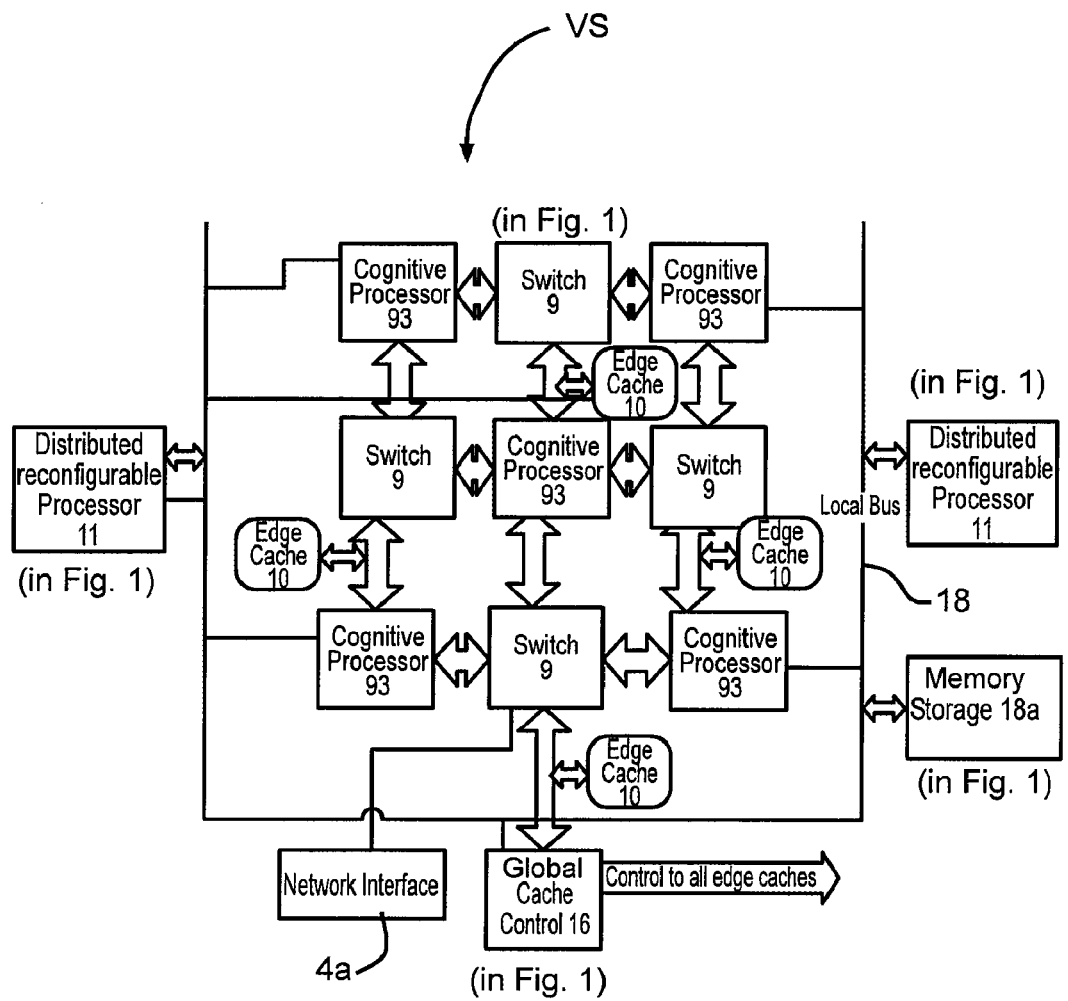
FIG. 2 shows a box diagram showing a distributed virtual connectivity switch.

FIG. 2 comprises an architecture diagram of an distributed virtual connectivity switch VS including cognitive processors 93, switches 9, edge caches 10, distributed reconfigurable processors 11, network interface 4a, global cache control 16, and storage 18a. The integrated virtual connective switch VS may comprise a mesh connected multi-processing architecture with distributed processor switch elements 9 having at least four ports per element. Each distributed element may comprise a cognitive processor 93 and a switch element 9. The cognitive processors 93 and 4-port switches 9 may be orthogonally laid and distributed. Every cognitive processor 93 may take intermediate decisions and pass it onto next cognitive processor 93 via switch 9. It may be possible to bypass a series of switches 9 for one cognitive processor 93 to virtually connect to another. By extending this concept to interface via the network interface 4a, a virtual switch VS may be implemented having cognitive capability across the entire infrastructure underlying the fabric. At each switch interconnection, an edge cache 10 may be inserted that caches intermediate decisions and data by the cognitive processor 93 to effectively be used by any other cognitive processor 93 without having to access data from the source.

Figure 3:
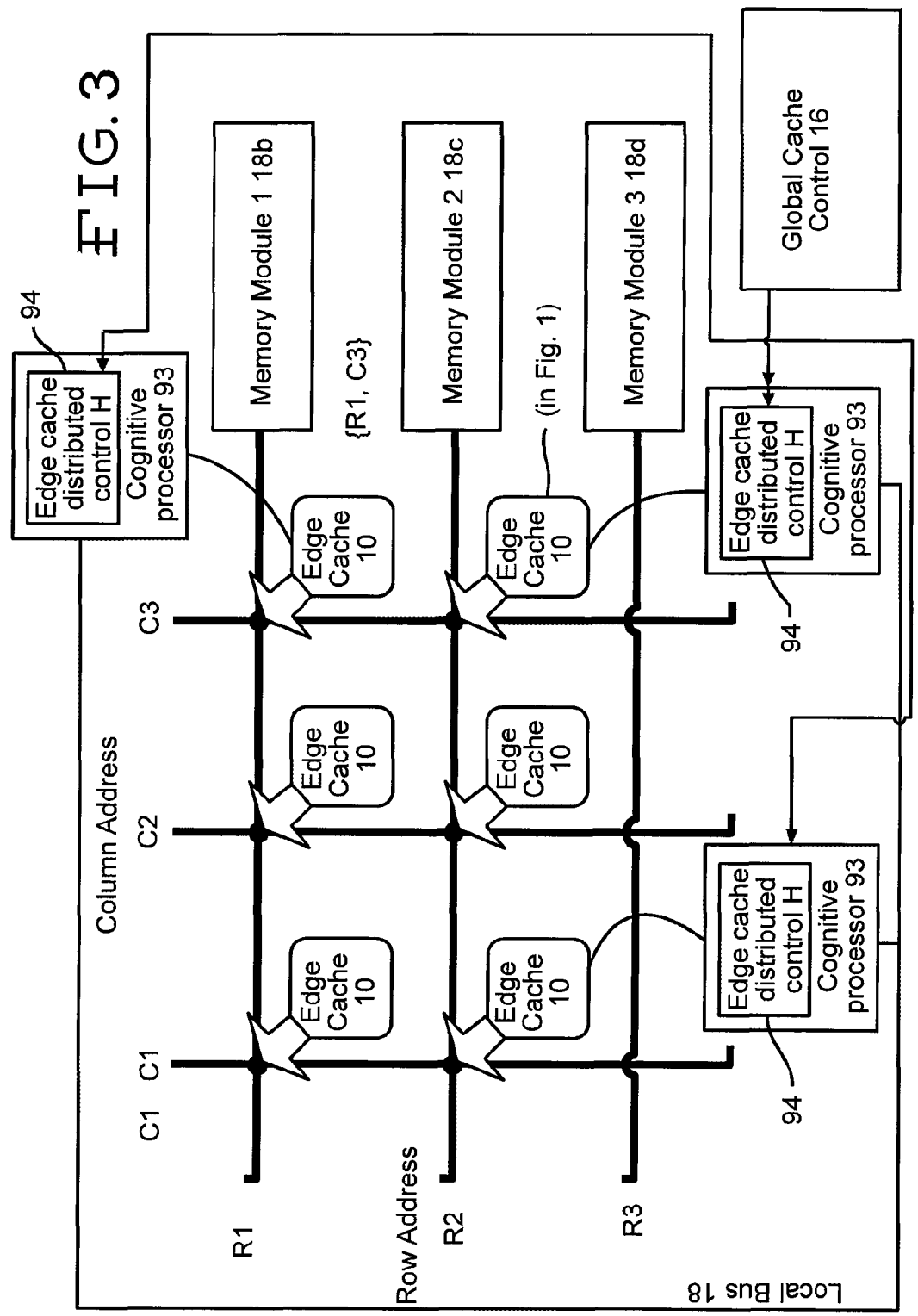
FIG. 3 shows storage memory partitioning and mapping for edge cache updates.

FIG. 3 shows storage memory partitioning and mapping for edge cache updates. The memory storage 18a of FIG. 1 is exemplary and as such may have distributed memory modules for partitioning the memory space and locations to rows and columns of the integrated switch matrix as shown in FIG. 3. Units 18b, 18c, 18d are memory modules shown for illustration. Each memory module 18b, 18c and 18d may have a row and column address and the intersection where the edge cache is located at the switch may identify the cache address. Each switch 9 (shown in FIG. 1) may have a line item for every memory module in 18a as shown in FIG. 3. The edge cache 10 may function on a configurable update policy set-up. For example, on cache read miss, the addressed cache (at the row and column address) may refresh its data and signal the addressed memory module of its intention. On cache write miss, all edge caches located on the row and column address may dictate refreshing the caches at the addressed row and column and subsequently writing to the identified memory module.

The edge cache update policy may be performed by each individual edge cache controller 94. As a generality a separate unit 94 is shown although the unit 94 may be located within the cognitive processor 93 that the edge cache 10 is attached to. In other words, the cognitive processor 93 (shown in FIG. 2) may perform the function of the edge cache distributed control 94 and may use its intelligence to provide cache update policy controls. The distributed edge cache control 94 arrangement shown is general to show that there is at least one controller for each cache. In the configuration of smart switch matrixes shown in FIG. 2, for simplicity, the distributed edge cache controller 94 (shown in FIG. 3) may be populated and located within all bottom left, top right, bottom right and center cognitive processors 93. However, with any other configuration selected for switch and cognitive processor attachments, more than one cognitive processor may be shared as a distributed edge cache controller allowing for greater fault tolerance for edge cache control. The edge cache control 16 shown in FIG. 1 may comprise a global cache controller that communicates to all distributed edge cache controllers 94 (shown in FIG. 3) via local bus 18. The entire configurations shown in FIGS. 2 and 3 are general but clearly show the scope of the mechanisms.

The mesh arrangement of integrated virtual switches 9 shown in FIG. 2 is exemplary. The configuration of switches 9 and cognitive processors 93 may use other bus topologies. However, the mesh configuration for integrated smart switches 9 may be inherently fault tolerant. A switch fault may be handled by bypassing the switch 9 and routing through alternative cognitive processors. Assuming that there are 4 port switches configured, any outer peripheral cognitive processors 93 may be connected to two switches 9 and all internal cognitive (non outer) processors may be connected to four switches. The mesh configuration may be simple, may be symmetric, may offer inherent fault tolerance, and may scale efficiently.

Figure 4:
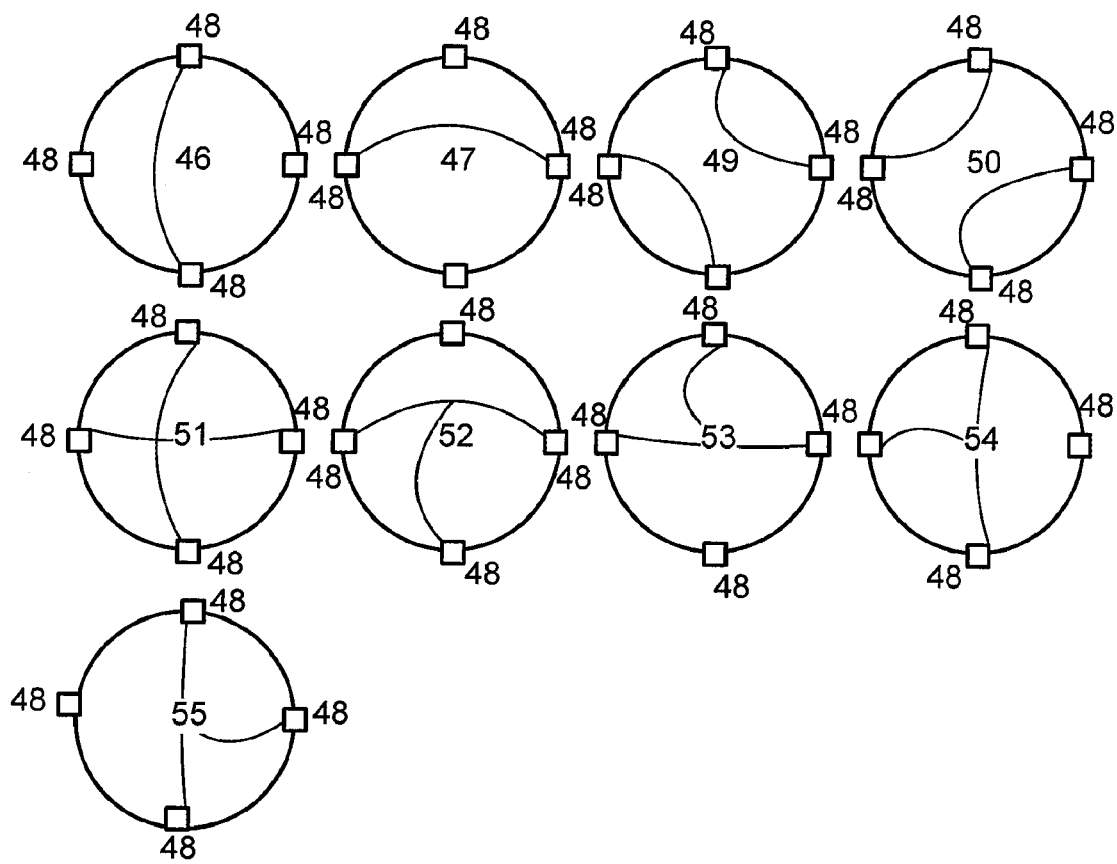
FIG. 4 shows a block diagram showing switch element configurations with 4-ports to each switch element of FIG. 3.

FIG. 4 shows a block diagram showing the switch element configurations 46, 47, 49, 50, 51, 52, 53, 54 and 55 with 4-ports 48 to each switch. The number of ports is configurable and the configuration shown with 4 ports is only illustrative.

The switch configuration is set in the fabric configuration generated during initialization. Configuration 51 represents a fully bypassed state of the switch so that the switch does no function and may be used to bypass the data. Configurations 52, 53, 54 and 55 may be in multi-cast modes in which data at one port is broadcasted to other ports. Configurations 46 and 47 may bypass on one pair of ports and may actively make decisions at other ports.

Figure 5:
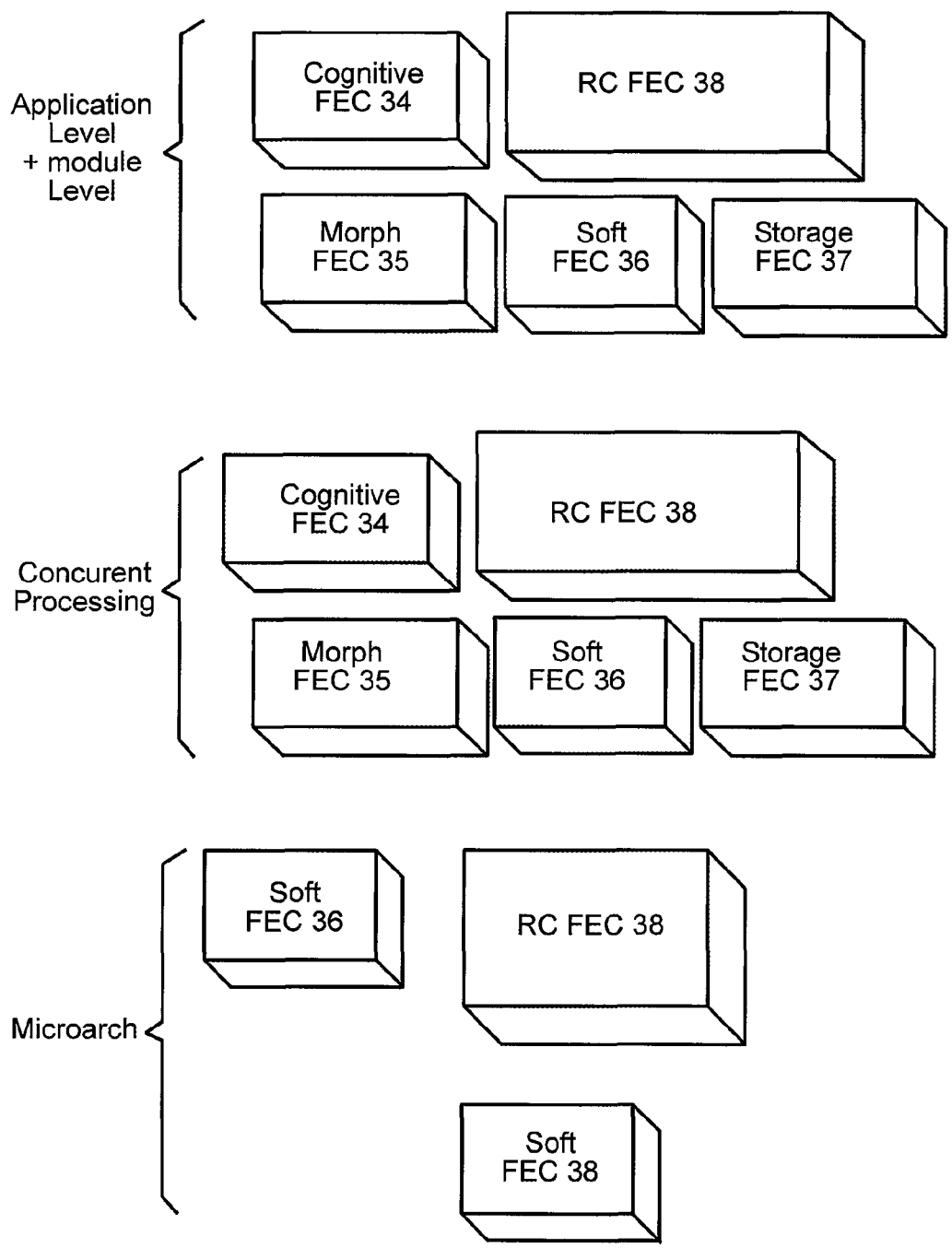
FIG. 5 shows a block diagram identifying different types of fabric element cells which may be instantiated on a chip.

FIG. 5 shows a block diagram identifying different types of fabric element cells which may be instantiated on a chip. The base entity of a fabric element may comprise a "fabric element cell" termed as FEC. The fluidity in the fabric may be demonstrated by the flexible residency of the fabric element cell within the physical entity. The fabric elements cells may comprise the lowest granularity fabric elements which may be mapped into a single physical entity or sub-elements of physical entities. The fabric element cell (FEC) may comprise the computing support to fabric functional elements for implementation and execution. In its generality, a FEC can be formed from a reconfigurable hardware and/or from software entities as a thread. For example, if security function is required for processing, a security fabric element may be formed by grouping FECs that may have different types of FEC to be adaptively selected. Each FEC may interact in a distributed environment with any of the other FECs. This capability may be translated to identification of fabric element cells in each functional entity and hardware units of the system-on chip.

The fabric element cells shown in FIG. 5 may be instantiated on a chip for representation of F1 30, F2 31, F32 and F4 33 etc shown in FIG. 6. Functions of the fabric elements slot may directly relate to the micro-arch functions offered by each different element type. The types, as shown in FIG. 5, may include cognitive fabric element cells 34, morph fabric element cells 35, soft fabric elements cells 36, storage fabric element cells 37, and reconfigurable fabric element cells 38. The cognitive fabric element cell 34 may implement cognitive control functions for hybrid processing units. The cognitive architecture may include fabric dynamic control characteristics to determine the control and privileges of a fabric element cell in any of the types identified above, and to determine how these fabric element cells may be clustered either in the same physical vicinity (in edge) or over the network (virtual neighborhood) for edge distributed computing. The morphing control 12 shown in FIG. 1 may provide overall control for how the fabric element cells forms into groups, reconfigure from one type to another, and monitor the status of FEC. With a cognitive brain added within a smart switch 8, the cognitive control to the morphing process may add greater optimization of resource utilization and performance.

As shown in FIG. 5, a morph fabric element cell 35 may control morphing of another fabric element cell residing in a global network/module level to a low level chip micro architecture. Each group may have one or more morph control cells whose primary function is to reconfigure other fabric element cells within its group or to self-reconfigure in its own state. With self-re-configurability added, a new state attained by a morph cell can attribute to new capabilities for remote reconfiguration of other fabric element cells.

As shown in FIG. 5, a soft fabric element cell 36 may comprise the portion of the hybrid processing performed in software. The soft fabric element cell 36 may be associated with multiple cores, and/or single or multiple programming threads in individual cores. The storage fabric element cell 18*a* shown in FIG. 1 may perform smart cache/memory data storage functions. A reconfigurable switch cache with intelligent policy updates can be built into the reconfigurable switch fabric. A reconfigurable fabric element cell 38, as shown in FIG. 5, may comprise the portion of the hybrid processing performed in reconfigurable hardware. The reconfigurable fabric element cell 38 may also be allocated with specific functions and mapped to hardware reconfigurable processors. The automated allocation and deployment of functions onto hardware and software may be directed by a cognitive cell application control.

FIG. 6 shows a box diagram showing morphing of fabric element cells within fabric. As shown, the FECs may be instantiated on a chip for representation of F1 30, F2 31, F3 32 and F4 33 etc. For example, a fabric element cell F1 30 can map into a module 1 and module 2 or into an entire single module or be formed as one of the elements in the parallel processing group to be executed concurrently with other fabric elements cells. For another example, two fabric element cells F2 24 and F3 26 may form as concurrent threads for execution. At the lowest level of processor micro architecture specific fabric element cells may be given direct functional slots or ID's to control the cells residing in the processor. The fabric may attach no physical implementation dependencies. At the higher level of morphing, groups of fabric element cells may be formed into a virtual group of application instances 21, 22 virtually residing across the global infrastructure. These groups of fabric element cells may be virtually connected and may pass through the network. One or more fabric elements may reside in the entire module, or groups of elements may form into a fabric. The format shown is exemplary. As the instruction length increases for large number of fabric element cells, encoded grouping may be required at the micro architecture level 29.

As shown in FIG. 6, the fabric morphing may include application 19 comprising application instances 21 and 22, modules 23 comprising fabric element cells 24, 25, and 26, concurrent processing 27 comprising fabric element cells 24, 25, 26, and 28, and processor micro-architecture 29 comprising fabric elements cells 30, 31, 32, and 33. It should be noted that different type of fabric elements cells may be associated with the morphing functions. However, at any given time, not all fabric element cells may be morphing.

Hierarchical distributed instruction streams may be propagated to multi-level fabric element cells. Each may be distributed with its own instruction control and may have slots to identify and control the intelligence in the fabric. Various fabric control words may be used to determine states and/or configurations of the fabric. For instance, 'scale factor' may identify the number of processing elements, memory ports, switch ports and at what level the fabric is emitted (global network to chip). 'Fabric ID' may identify unique fabric elements in multi-modular systems and 'Distributed Fabric Function' may identify distributed security, networking, and low level application processing. A 'reconfigurable fabric manager' may control the two-level hybrid scheduling and this manager may also identify the upward status given by each hierarchical level to its next higher level.

Figure 7:
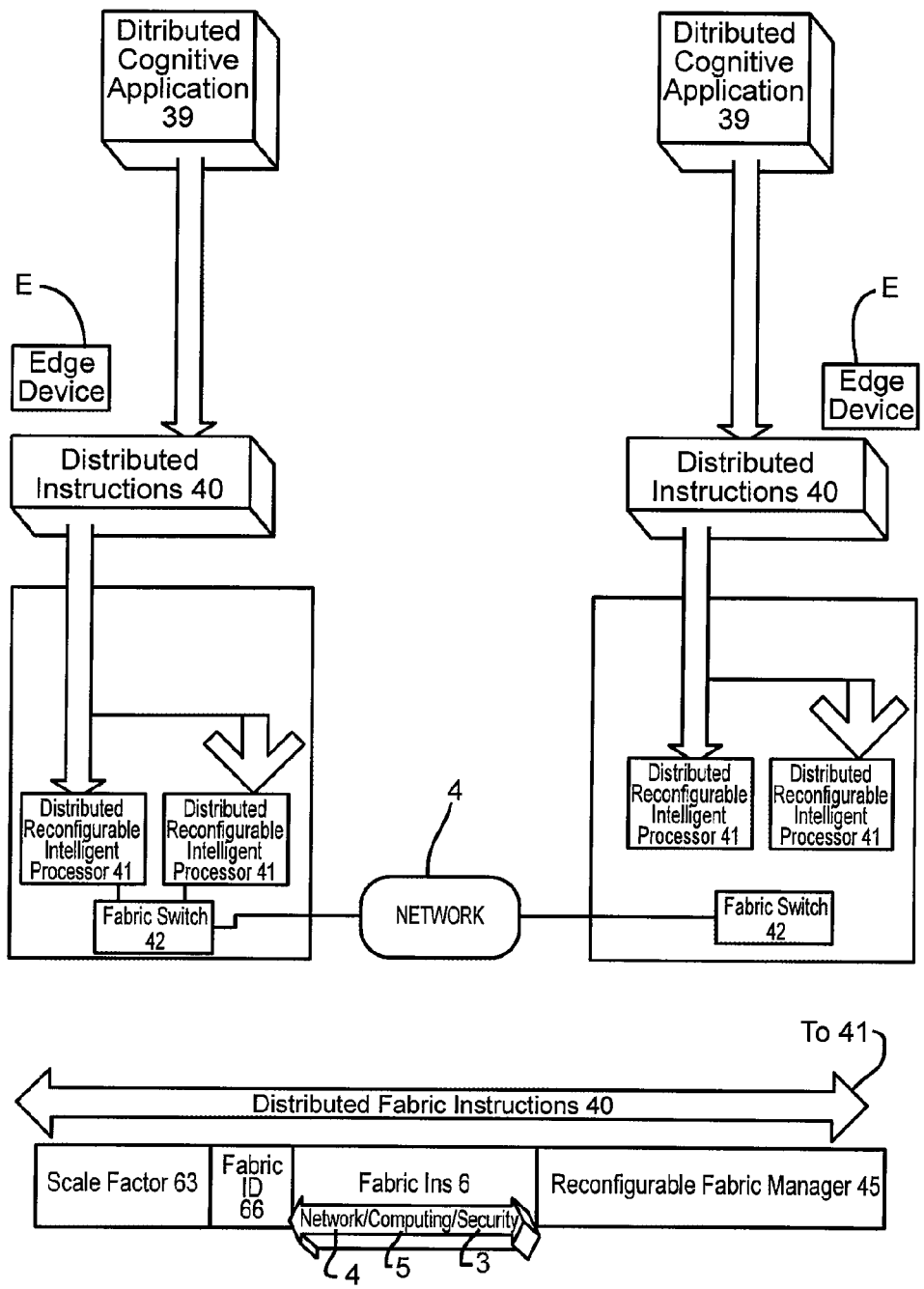
FIG. 7 shows a box diagram showing the delivery of distributed instructions within a fabric chip.

FIG. 7 shows a diagram illustrating the delivery of distributed instructions 40 within a chip as an edge device E. The distributed cognitive application 39 may be attached to the distributed instructions 40. The distributed instructions 40 may be attached to the distributed reconfigurable intelligent processor 41. The distributed reconfigurable intelligent processor may be attached to the fabric switch 42. The fabric switch 42 may be attached to fabric system infrastructure elements such as computing element 5, networking element 4, security element 3, or other types of elements such as a storage element. The distributed fabric instruction 40 may be distributed over a scale factor 63, a fabric ID 66, fabric instructions 6, and reconfigurable fabric manager 45 (also referred to as slot 45 or unit 45). Slot 45 may provide basic rules for engagement and merging of static and run-time scheduling. The reconfigurable fabric manager 45 may optimize the selection of groups of processor functional units for execution and may coordinate the scheduling. In addition to the two-level scheduling coordination function, unit 45 may also receive dynamic status updates from all scheduled functional units in the distributed reconfigurable intelligent processor 41 and may provide the next state to initiate an execution of the next reconfigurable step.

The format of the distributed instructions 40 as shown in FIG. 7 may be generic and selectable. Very Large Scale Integration (VLIW) VLIW architectures may be selected to offer low cost and energy high performance solutions. Distributed VLIW may scale more efficiently than traditional VLIW architectures. Other instruction languages and formats such as Extensible Markup Language (XML) may also be used. If XML is used, then the necessary XML parsing processing may be instantiated in the reconfigurable processing elements or on the soft processors. The distributed instructions 40 may be executed on the distributed reconfigurable intelligent processors 41 and the data may be routed via a fabric switch 42 to other module chips.

The fabric chip mechanism may comprise a combination of instructions from the compiler and/or parser (static scheduling) which may be added with second level run-time hardware scheduling such as traditional superscalar architecture via a reconfigurable fabric manager 45. If superscalar scheduling is used, it may provide many advantages for performance sensitive run-time events (memory access, branch prediction, cache access, etc) which may be difficult to achieve good results with from compiler and parser driven mechanisms. Complexity and cost of the hardware scheduler may be reduced with a hybrid offering as compared to a fully superscalar architecture.

Figure 8:
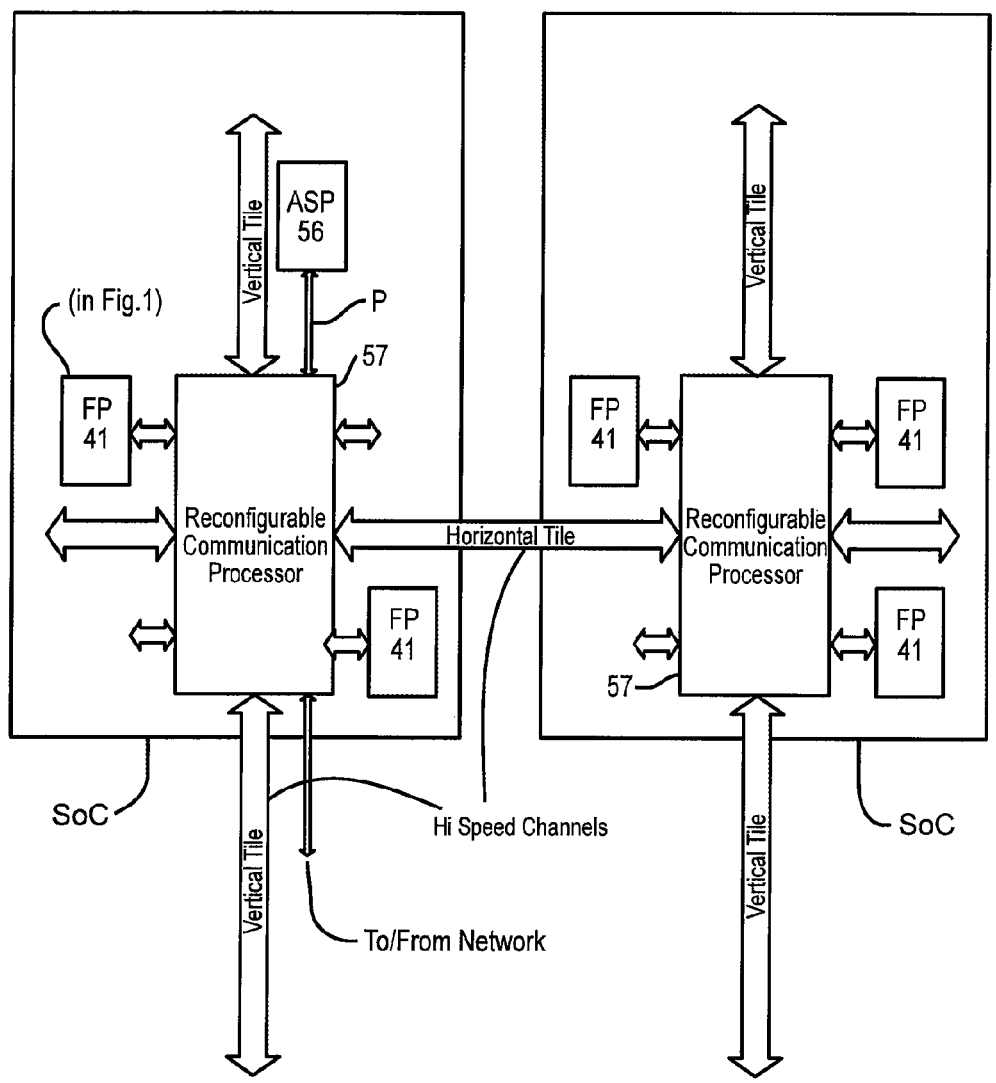
FIG. 8 shows a populated module and use of multiple fabric chip solutions to build a fabric SoC module at the edge of a network.

FIG. 8 shows a generic resource populated module with multiple fabric chips 41 and global adaptation of the chip architecture in multiple fabric chip solutions to build a fabric module at the edge of the network. Each chip infrastructure comprises soft processor 14 (shown in FIG. 1), distributed reconfigurable elements 11 (shown in FIG. 1), and a reconfigurable communication processor 57 to interconnect them globally to form a fabric group. The horizontal and vertical tiling at the module level may comprise a high speed serial interconnect. For Application specific processor (ASP) 56, the channels P may be programmable as high speed serial or use proprietary interconnect channels with high speed serial adapters. Unit ASP 56 may also perform deep content inspection and pattern matching for multi-GB network demand. Fabric processor 41 may comprise all the chip elements shown in FIG. 1. Reconfigurable communication processor 57 may be instantiated as a reconfigurable fabric core embedded in the fabric chip to provide communication of one module to another via high speed serial channels. Unit 57 may act as a reconfigurable switch fabric. The multiple chip module may scale by horizontal and vertical tiling as shown.

The fabric chip system shown in FIG. 1 may also be used for hardware acceleration processing. In such a manner, general purpose reconfigurable processing elements 11 may be used for specific hardware acceleration functions. An array of such elements may offer powerful reconfigurable computing solutions for adaptive stream processing for signal processing and packet processing applications. For example, signal processing sequences as frames and packets can be processed on a number of such distributed reconfigurable processing elements 11.

Figure 9:
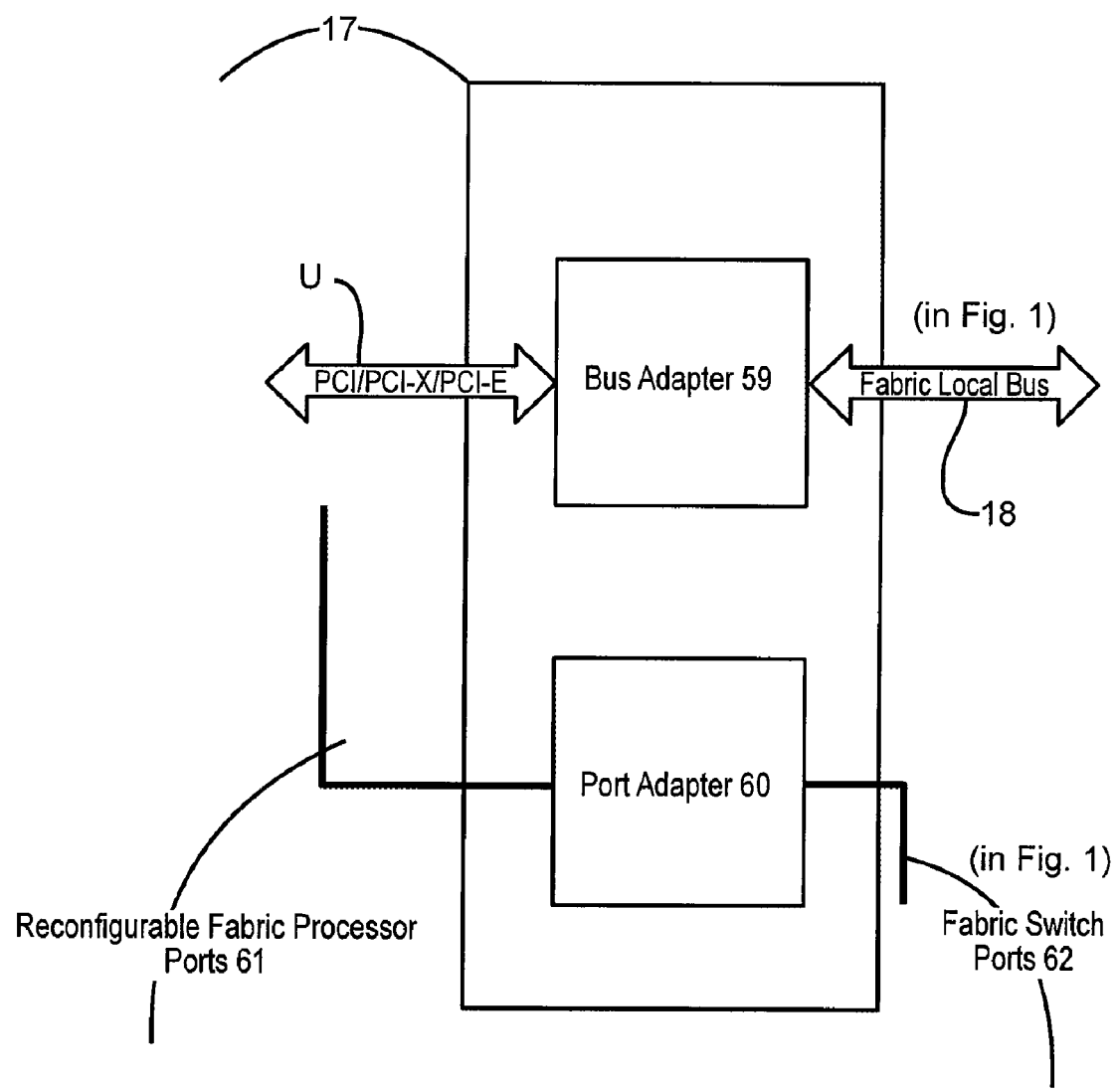
FIG. 9 shows an illustrative chip interface to an external reconfigurable communication processor.

FIG. 9 shows an illustrative interface which may be required for the external reconfigurable communication processor 57 of FIG. 8. The bus adapter 59 may provide an interface between a local bus 18 to a standard PCI/PCI-X/PCI-E bus U using the external reconfigurable communication processor 57 (shown in FIG. 8). Port Adapter 60 may provide a reconfigurable interface from fabric chip switch ports to external reconfigurable communication processor ports 61. Once the reconfigurable communication processor 57 (shown in FIG. 8) is interfaced to the fabric processor 41 (shown in FIG. 1), unit 57 may also provide a reconfigurable and adaptable network interface to the fabric chip in addition to the network interface 4a shown in FIG. 2.

Figure 10:
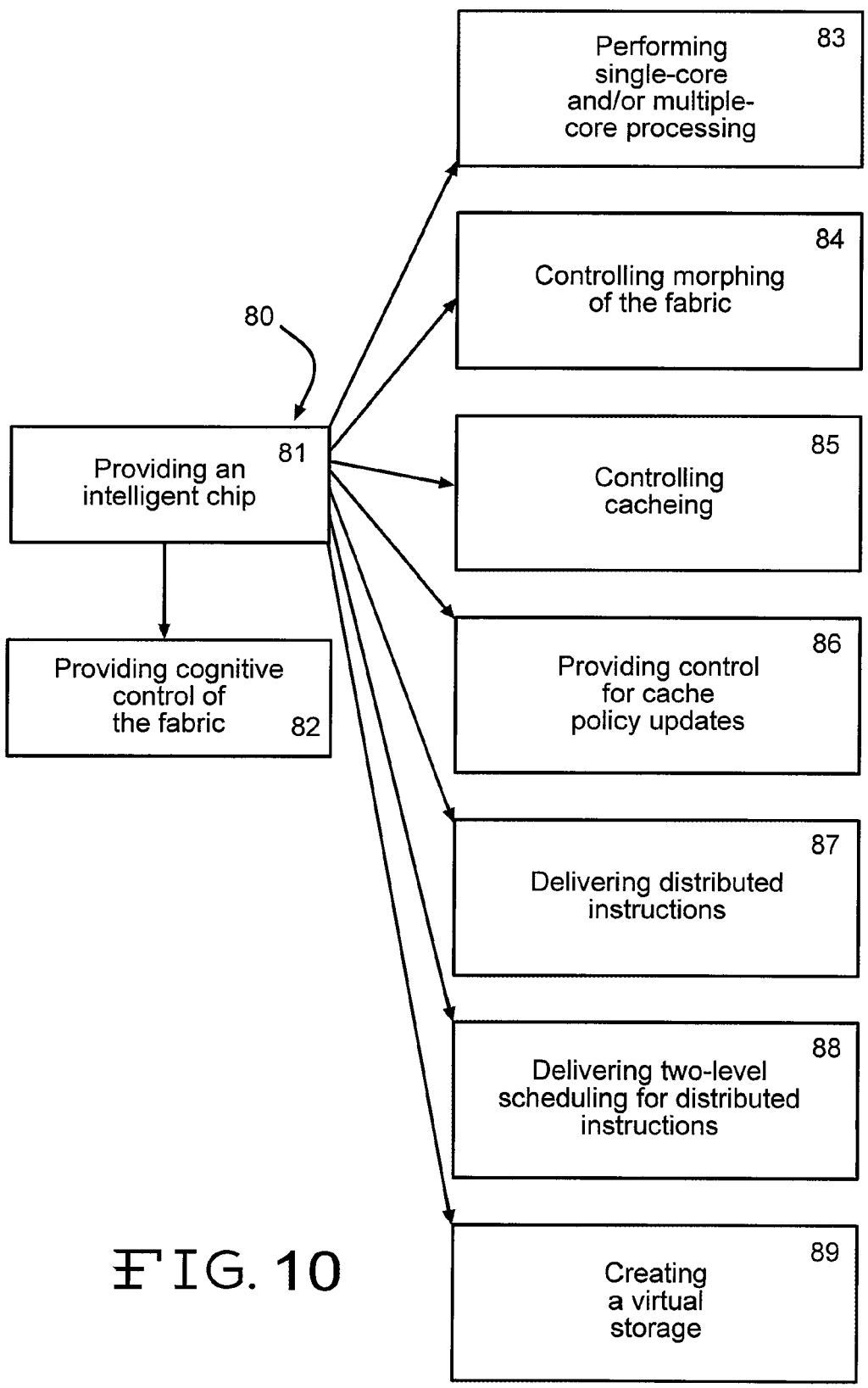
FIG. 10 shows a flowchart of one embodiment of a method of providing cognitive control in a fabric chip.
Figure 11:
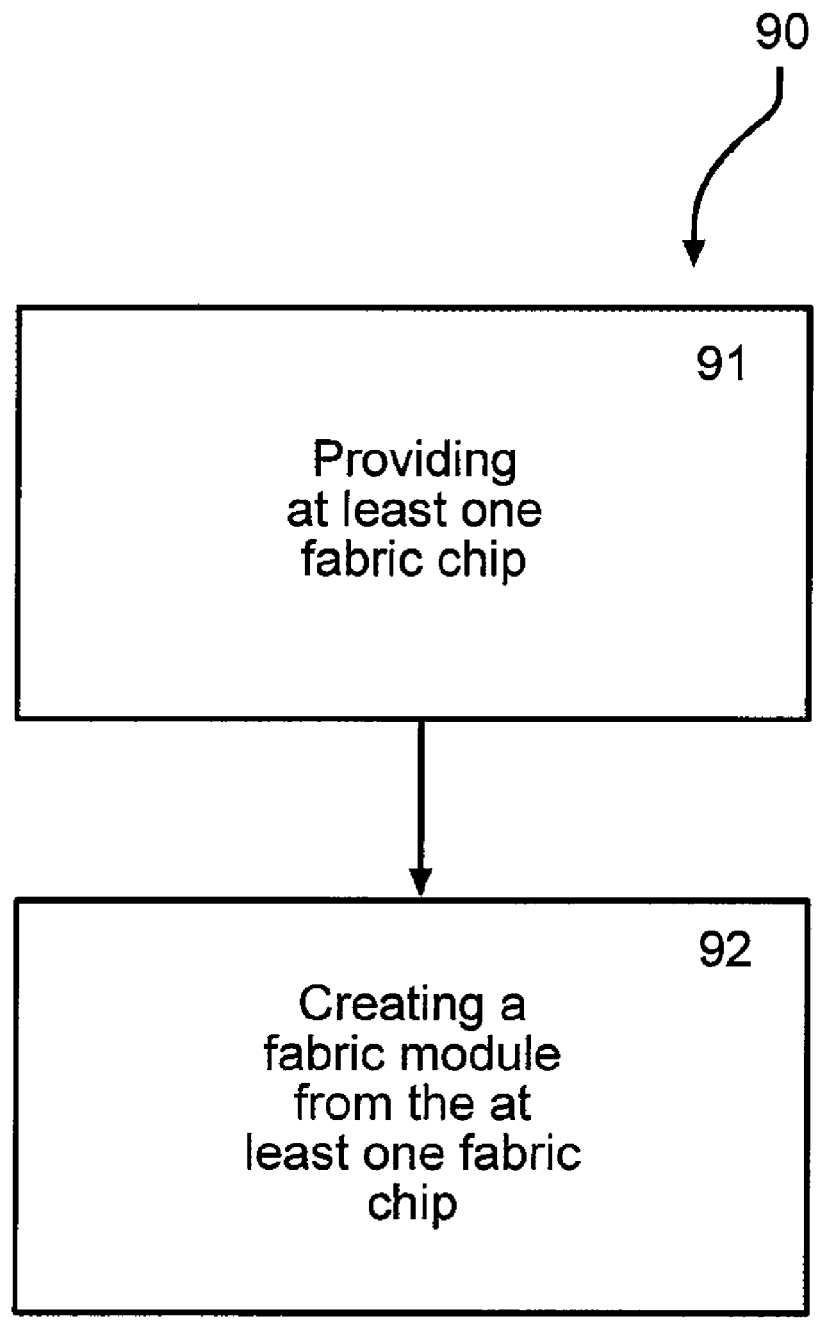
FIG. 11 shows a flowchart of one embodiment of a method for creating a fabric module.

FIG. 10 shows a flowchart of one embodiment of a method 80 of providing cognitive control for the fabric. In one step 81, an intelligent fabric chip may be provided comprising a soft application processor, a reconfigurable hardware intelligent processor, and a distributed memory storage. Step 81 may further comprise one or more of: providing a morphing control processor; providing an edge cache control processor; and providing a distributed integrated smart virtual connectivity switch. In another step 82, cognitive control of the fabric may be provided using the reconfigurable hardware intelligent processor to at least one of allocate, reallocate, performance monitor, and fabric morph.

The method 80 may further comprise one or more of the following steps: step 83 comprising performing at least one of single core and multi-core processing using the soft application processor; step 84 comprising controlling the morphing of the fabric using a morphing control processor; step 85 comprising controlling distributed edge cache controllers; step 86 comprising providing control for edge cache policy updates; step 87 comprising the reconfigurable hardware intelligent processor delivering distributed instructions; step 88 comprising the reconfigurable hardware intelligent processor delivering a two-level scheduling for distributed instructions; and step 89 comprising creating a virtual storage using a provided memory storage integrated with edge cache.

In another embodiment of the disclosure, as shown in FIG. 1, a method 90 may be provided for creating a fabric module. In one step 91, at least one fabric chip may be provided. The fabric chip may comprise an intelligent fabric. The intelligent fabric may comprise a soft application processor, a reconfigurable hardware intelligent processor, a partitioned memory storage, and an interface to an external reconfigurable communication processor. The reconfigurable hardware intelligent processor may be configured to: implement a distributed cognitive inference engine; implement a general purpose distributed reconfigurable processor; and provide cognitive control for at least one of allocation, reallocation, and performance monitoring. In an additional step 92, the fabric module may be created from the at least one provided fabric chip.

Other aspects and features of the present disclosure may be obtained from a study of the drawings, the disclosure, and the appended claims. It should be understood, of course, that the foregoing relates to exemplary embodiments of the disclosure and that modifications may be made without departing from the spirit and scope of the disclosure as set forth in the following claims.

The invention claimed is:

1. A chip having an intelligent fabric comprising:
a security element, a computing element, and a networking element all driven by a cognitive element and morphed into virtual intelligent fabric cells comprising granular entities, the virtual intelligent fabric cells morph-able from a global application to a micro-architecture, and providing fluidity in the intelligent fabric due to flexible residency of the virtual intelligent fabric cells within a single physical entity or sub-elements of physical entities;

a soft application processor, a reconfigurable hardware intelligent processor, a partitioned memory storage, and an interface to an external reconfigurable communication processor;

wherein the reconfigurable hardware intelligent processor is configured to implement a distributed cognitive processor, is configured to implement a distributed reconfigurable processor, and is configured to provide cognitive control for at least one of allocation, reallocation, or performance monitoring.

2. The chip of claim 1 wherein the soft application processor utilizes at least one of a single core or a multi-core for processing.

3. The chip of claim 1 further comprising a fabric morphing control processor.

4. The chip of claim 3 wherein the fabric morphing control processor is configured to control fabric morphing to provide morphing of at least one level of the fabric comprising at least one of a system, a network, a module, or a chip.

5. The chip of claim 1 further comprising a configurable organization of general purpose processing elements and a distributed smart virtual connectivity switch integrated with at least one of an organization of distributed reconfigurable processing elements, a virtual connectivity switch, a partitioned memory storage, or an edge cache element.

6. The chip of claim 1 wherein the partitioned memory storage is partitioned and coordinated with a distributed edge cache to create a virtual storage.

7. The chip of claim 1 further comprising a global edge cache control processor configured to provide global control for distributed edge cache controllers at one or more locations near a smart virtual connectivity switch.

8. The chip of claim 1 wherein the reconfigurable hardware intelligent processor comprises distributed reconfigurable processing elements.

9. The chip of claim 1 further comprising a smart virtual connectivity switch comprising at least one distributed reconfigurable processing element and at least one port per element.

10. The chip of claim 1 wherein an interface is provided between a smart virtual connectivity switch and the external reconfigurable communication processor.

11. The chip of claim 1 wherein the reconfigurable hardware intelligent processor is configured to generate distributed instructions.

12. The chip of claim 1 wherein the reconfigurable hardware intelligent processor is configured to generate a two level scheduling of distributed instructions streams propagated to the virtual intelligent fabric cells to identify and control the intelligence in the intelligent fabric.

13. The chip of claim 1 wherein the reconfigurable hardware intelligent processor is configured to generate a second level of run-time hardware scheduling for the fabric via a reconfigurable fabric manager.

14. The chip of claim 1 wherein the chip is part of a fabric module.

15. A method of providing cognitive control for a fabric comprising:

providing an intelligent fabric chip comprising a security element, a computing element, and a networking element all driven by a cognitive element, a soft application processor, a reconfigurable hardware intelligent processor, and a distributed memory storage;

providing cognitive control of the fabric using the reconfigurable hardware intelligent processor to at least one of allocate, reallocate, performance monitor, or fabric morph;

morphing the security element, the computing element, the networking element, and the cognitive element into virtual intelligent fabric cells comprising granular entities; and morphing the virtual intelligent fabric cells from a global application to a micro-architecture providing fluidity in the intelligent fabric chip due to flexible residency of the virtual intelligent fabric cells within a single physical entity or sub-elements of physical entities.

16. The method of claim 15 further comprising the step of performing at least one of single core processing or multi-core processing using the soft application processor.

17. The method of claim 15 wherein the first providing step further comprises providing a morphing control processor.

18. The method of claim 17 further comprising the step of controlling morphing of the fabric using the morphing control processor.

19. The method of claim 15 further comprising the step of providing a partitioned memory storage integrated with an edge cache to create a virtual storage.

20. The method of claim 15 wherein the first providing step further comprises providing an edge cache control processor which is configured to control distributed edge cache controllers.

21. The method of claim 15 wherein the first providing step further comprises providing a distributed smart virtual connectivity switch.

22. The method of claim 15 further comprising the step of providing control for edge cache policy updates.

23. The method of claim 15 further comprising the step of the reconfigurable hardware intelligent processor delivering distributed instructions.

24. The method of claim 23 further comprising the step of the reconfigurable hardware intelligent processor delivering a two-level scheduling for distributed instructions streams propagated to the virtual intelligent fabric cells to identify and control the intelligence in the intelligent fabric.

25. A method for creating a fabric module comprising:

providing at least one fabric chip, the fabric chip comprising: an intelligent fabric comprising a security element, a computing element, and a networking element all driven by a cognitive element; a soft application processor; a reconfigurable hardware intelligent processor; a partitioned memory storage; an interface to an external reconfigurable fabric processor; and virtual intelligent fabric cells, the virtual intelligent fabric cells comprising granular entities, being morph-able from a global application to a micro-architecture, and providing fluidity in the intelligent fabric due to flexible residency of the virtual intelligent fabric cells within a single physical entity or sub-elements of physical entities, wherein the reconfigurable hardware intelligent processor is configured to: implement a distributed cognitive inference engine; to implement a general purpose distributed reconfigurable processor; and to provide cognitive control for at least one of allocation, reallocation, or performance monitoring; and creating a fabric module from the at least one provided fabric chip.

* * * * *